United States Patent
Corman et al.

[15] 3,656,035
[45] Apr. 11, 1972

[54] HEAT PIPE COOLED CAPACITOR

[72] Inventors: James C. Corman, Scotia; Peter E. Kelly, South Glens Falls, both of N.Y.

[73] Assignee: General Electric Company

[22] Filed: May 4, 1971

[21] Appl. No.: 140,193

[52] U.S. Cl. ..........................317/243, 174/DIG. 5, 317/260
[51] Int. Cl. .....................................................H01y 1/08
[58] Field of Search............................317/243, 260; 336/61; 174/DIG. 5

[56] References Cited

UNITED STATES PATENTS 3,541,487  11/1970  Leonard..............................336/61 X Primary Examiner—E. A. Goldberg
Attorney—Paul A. Frank, John F. Ahern, Julius J. Zaskalicky, Frank L. Neuhauser, Oscar B. Waddell and Joseph B. Forman

[57] ABSTRACT

In a capacitor in which the electrodes are in the form of elongated conductive sheets separated by elongated dielectric sheets and wound in a compact convolute or roll form with exposed electrodes at each roll edge, heat dissipation is augmented by a chill plate in contact with one of the exposed sheet electrodes at a roll edge and by a plurality of heat pipes connected to the chill plate.

8 Claims, 2 Drawing Figures

Patented April 11, 1972

3,656,035

INVENTORS
JAMES C. CORMAN
PETER E. KELLY
BY Julius J. Zeskalicky
THEIR ATTORNEY

HEAT PIPE COOLED CAPACITOR

The present invention relates, in general, to high frequency capacitors and in particular to cooling means for such capacitors.

Capacitors are used in a number of applications, such as in power supplies and inverters. When such equipments are operated at higher frequencies, higher rates of heat dissipation occur in the dielectric and electrode materials of the capacitors. A capacitor of a predetermined capacitance and a predetermined maximum operating voltage for low frequency applications has a predetermined volume or size. When a capacitor having the same capacitance and voltage ratings is operated at a higher frequency, a greater amount of heat is dissipated. Accordingly, a much larger volume would be required for the capacitor to dissipate the internally generated heat without exceeding the thermal limits of the materials used in the capacitor. The increase in size of the capacitors increases the materials required for, as well as the weight and cost of the capacitor.

The present invention is directed to cooling means for capacitors useable at higher frequencies to reduce the size, weight, and cost of such capacitors over conventional capacitors having the same ratings.

In an illustrative embodiment of the present invention as applied to an exposed foil capacitor having a pair of foil sheet or strip electrodes, each of a predetermined width, and wound into a convolute or roll form, there is provided a thermally conductive plate connected to the exposed foil edge of the roll and oriented generally transverse to the width dimension of the roll. A plurality of heat pipes each having an input section and an output section are provided with the input sections connected in good heat conductive relationship to the conductive plate. Accordingly, any heat developed in the dielectric and in the foil electrodes of the capacitor are conducted through the foil electrode to the conductive plate from which the heat is efficiently dissipated to the atmosphere by the heat pipes.

The features of our invention which we desire to protect are pointed out with particularity in the appended claims. The invention itself, however, both as to its organization and method of operation together with further objects and advantages thereof may best be understood by reference to the following description taken in connection with the accompanying drawing wherein:

Figure 1:
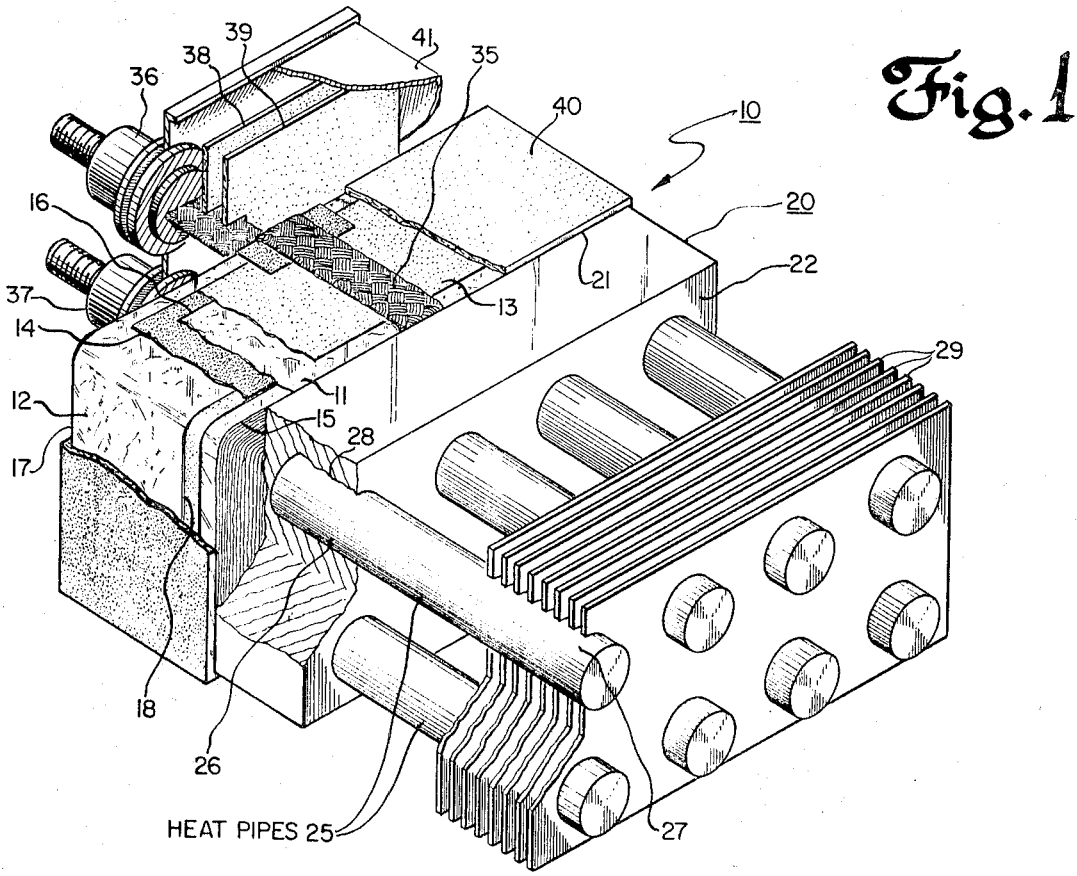
FIG. 1 is a perspective view, partially exploded and partially in section, showing the construction of a capacitor in accordance with the present invention.

Referring now to FIG. 1, there is shown a capacitor 10 including a strip or sheet 11 of conductive material of predetermined width forming one electrode of the capacitor, and another foil strip or sheet 12 of conductive material of substantially the same predetermined width forming another electrode for the capacitor. The capacitor also includes one or more sheets or strips 13 and 14 of dielectric material of usually the same width which function as dielectric spacers between the sheet electrodes 11 and 12. The sheets 11 and 12 of conductive material are alternately interleaved with the sheets 13 and 14 of dielectric material with adjacent edges of the sheets of dielectric material in registry. One edge 15 of electrode 11 extends beyond the adjacent edges of the dielectric sheets 13 and 14 and the other edge 16 of the electrode 11 lies between edges of the dielectric sheets 13 and 14. Similarly, edge 17 of the other electrode 12 extends beyond the other adjacent edges of the dielectric sheets 13 and 14 and the other edge 18 of the electrode 12 lies between the edges of the dielectric sheets 13 and 14. This kind of capacitor is usually referred to as an exposed foil design. The interleave structure of the pair of sheet electrodes 11 and 12 and the sheets of dielectric spacers 13 and 14 are wound into a coil or roll of generally rectangular configuration. It is preferably to keep the axial dimensions of the coil or roll at a minimum for more effective operation. In a preferred embodiment of the invention the axial dimension of the roll, or height, is less than the width of the roll. If the roll is flattened, as in FIG. 1, the shorter width dimension is referred to as the thickness of the roll. The sheets 13 and 14 of dielectric material may be of various dielectric materials including paper and synthetic resin such as, for example, polyester, polycarbonate or polyolefins. The sheets 11 and 12 of conductive material are preferably made of aluminum foil. In one preferred embodiment of the invention, one exposed edge 15 of the foil electrode 11 is soldered or otherwise joined to form a single conducting surface. A heat conductive means or chill plate 20 is provided in the form of a copper plate or block of rectilinear form having a pair of opposed faces 21 and 22. One face 21 of the block is soldered to the coiled edge 15 of the sheet electrode 11.

A plurality of heat pipes 25 are provided, each having a heat input section 26 and a heat output section 27. A heat pipe is a device utilizing an evaporation and a condensation cycle for transferring heat from a hot or heat input section to a cold or heat output section with minimum temperature drop usually with less temperature drop than attainable with solid blocks of good heat conductive materials. The heat pipes shown each comprises a closed tubular container in which is included a wicking material saturated with a vaporizable liquid such as water or freon and extending from the heat input region to the heat output region thereof. The addition of heat at the heat input section 26 of the container evaporates the liquid being supplied thereto by the wicking material. The vapor moves to the heat output section 27 of the container where it is condensed. The condensed liquid is returned to the heat input region by capillary action in the wicking material. The heat pipes 25 shown may be heat pipes of the kind described and claimed in a copending application, filed and assigned to the assignee of the present invention and of the kind disclosed and described in an article entitled "The Heat Pipe" by G. Yale Eastman in Scientific American Magazine of May 1968. The heat input sections 25 of the heat pipes are shown embedded in holes 28 provided in the plate 20 to provide good thermal conduction from the plate 20 to the input sections of the heat pipes. The plate 20 is provided with adequate volume to minimize any temperature drop therein. A plurality of fins 29 are provided connecting the output sections of the heat pipes 25 to increase the dissipation of heat from the output sections 27 to the atmosphere.

Also shown is a flexible conductor 35 connecting the exposed edge 15 of foil electride 11 to an external terminal 36. The other edge 17 of foil electrode 12 lies in an opposed face of the roll, is soldered together, and connected to another flexible conductor (not shown) which in turn is connected to the terminal 37. A pair of sheet insulators 38 and 39 are provided adjacent the terminals 36 and 37 to insulate the upper edge 17 of the sheet electrode 12 from the flexible conductors connected to the terminals 36 and 37. Side insulation member 40 is provided encircling the roll capacitor to insulate it from a casing or housing 41 shown in partial section.

In the operation of the device, the heat generated in the dielectric sheets 13 and 14 and also in the electrodes 11 and 12 of the capacitor by the utilization of alternating currents for the capacitor, particularly currents of higher frequencies, is conducted by the electrodes to the plate 20 from which the heat is dissipated to the atmosphere by means of the heat pipes 25. The height dimension of the roll is short so as to provide a short thermal conduction path from the inner portion of the capacitor where the heat is generated to the plate.

Figure 2:
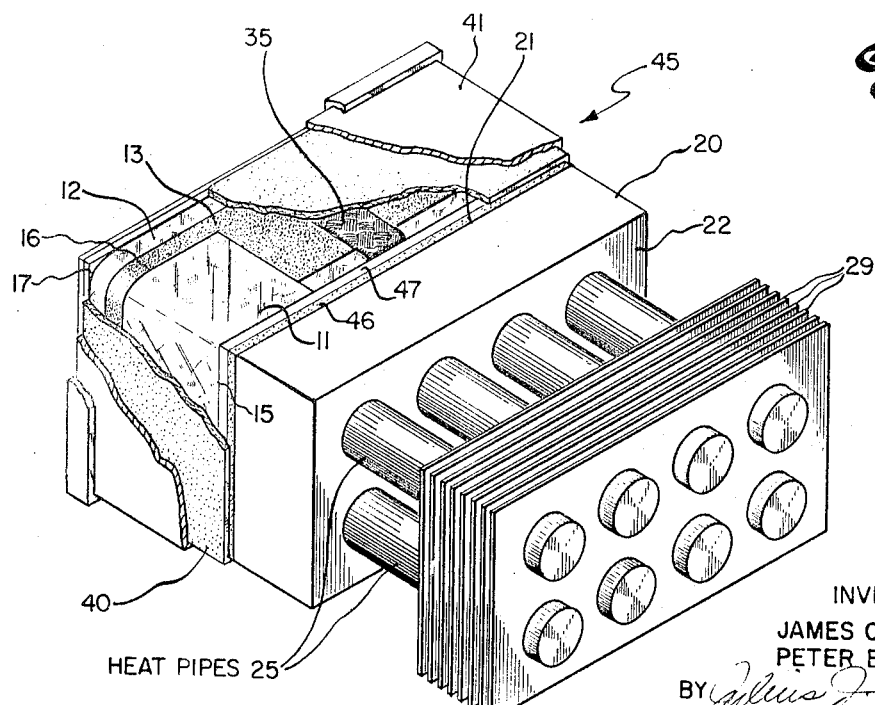
FIG. 2 is a perspective view of another embodiment of a capacitor in accordance with the present invention, similar to the embodiment of FIG. 1 and partially in section to show certain constructional features thereof.

Referring now to FIG. 2, there is shown another embodiment of a capacitor 45 in accordance with the present invention, similar to the embodiment of FIG. 1 and in which identical elements are identically designated. The embodiment of FIG. 2 differs over the embodiment of FIG. 1 in that a layer 46 of material which provides good heat conduction along with good electrical insulation, such as alumina or beryllia, is connected between the coiled edge 15 of the sheet electrode 11 and the plate 20. Such material as alumina or beryllia is flame sprayed onto an opposed face 21 of the plate. The exposed face of the sprayed layer 46 is then coated with a conductive layer 47 of a material, such as copper or aluminum, which can be readily soldered to the exposed edge 15 of electrode 11. As the layer 46 of flame sprayed dielectric material is thin and as a broad area is provided transverse to the heat conduction path, minimal increase in thermal impedance between the edge and the plate occurs while the plate 20 and associated heat pipes are electrically insulated from the electrode 11. The layer of material providing electrical insulation of the exposed edge 15 and the plate 20 may also be a thermally conductive epoxy, one face of which is mechanically bonded to the exposed edge 15 and the other face of which is mechanically bonded to the plate 20.

While in the embodiment shown and described a heat conductive means and associated heat pipes were secured to one electrode of the capacitor, it will be understood that another heat conductive means and associated heat pipes could be secured to the other electrode of the capacitor thereby increasing the heat dissipation capability of the capacitor and increase its current handling capability.

While the invention has been described in specific embodiments it will be appreciated that modifications may be made by those skilled in the art and we intend by the appended claims to cover all such modifications and changes as fall within the true spirit and scope of the invention.

What we claim as new and desire to secure by Letters Patent of the United States is:

1. A capacitor comprising
   alternate electrode and dielectric strips formed to provide a side of exposed foil edges,
   a heat conduction block connected to said exposed foil edges,
   a heat pipe having a heat input section and a heat output section, said heat input section being connected in good heat conductive relationship to said block.

2. A capacitor comprising
   an alternate array of foil electrodes and dielectric strips wound into a roll to provide an exposed foil edge of one of said electrodes at one end of said roll,
   a heat conduction means having a pair of opposed faces, one of said faces connected to said exposed foil edge of said roll and oriented generally transverse to the longitudinal axis of said roll,
   a heat pipe having a heat input section and a heat output section, said heat input section being connected in good heat conductive relationship to said heat conductive means.

3. The combination of claim 2 in which said heat conductive means is a conductive plate having a pair of opposed faces, one of said faces conductively connected to said exposed foil edge of said roll and oriented generally transverse to the longitudinal axis of said roll.

4. The combination of claim 3 in which said plate includes a pair of opposed electrically conductive faces and includes an electrically insulating layer interposed between said faces to electrically insulate said opposed faces, said layer being constituted of a material which provides good heat conduction.

5. The combination of claim 2 in which the height of said roll is less than either the thickness or width of said roll.

6. The combination of claim 3 in which is provided a plurality of heat pipes, each having a heat input section and a heat output section, each of said heat input sections connected in good heat conductive relationship to said plate and extending from the other opposed face of said plate.

7. The combination of claim 2 in which said roll provides another exposed foil edge of the other of said electrodes including another heat conduction means connected to said other exposed foil edge and oriented generally transverse to the longitudinal axis of said roll and including another heat pipe having a heat input section and a heat output section, said heat input section being connected in good heat conductive relationship to said other heat conduction means.

8. The combination of claim 3 in which a thermally conductive and electrically insulating layer of material is interposed between said exposed foil edge of said roll and said one face of said plate.

* * * * *